United States Patent
Loghmani et al.

(10) Patent No.: US 6,941,273 B1
(45) Date of Patent: Sep. 6, 2005

(54) TELEPHONY-DATA APPLICATION INTERFACE APPARATUS AND METHOD FOR MULTI-MODAL ACCESS TO DATA APPLICATIONS

(76) Inventors: Masoud Loghmani, 10607 Muirfield Dr., Potomac, MD (US) 20854; Fred F. Korangy, 2074 Maid Stone Farm Rd., Annapolis, MD (US) 21401

( * ) Notice: Subject to any disclaimer, the term of this patent is extended or adjusted under 35 U.S.C. 154(b) by 0 days.

(21) Appl. No.: 09/167,485

(22) Filed: Oct. 7, 1998

(51) Int. Cl.[7] .............................................. G06F 17/60
(52) U.S. Cl. ..................... 705/26; 704/270; 704/275; 704/260; 704/232; 704/231; 704/10; 709/200; 379/90.01
(58) Field of Search .................... 705/26, 27; 704/231, 704/232, 10, 275, 270, 260; 370/352; 379/90.01, 379/88.01, 88.13, 88.22; 709/200

(56) References Cited

U.S. PATENT DOCUMENTS

| | | | |
|---|---|---|---|
| 5,291,583 A | | 3/1994 | Bapat |
| 5,715,314 A | | 2/1998 | Payne et al. |
| 5,745,681 A | * | 4/1998 | Levine et al. ............... 709/200 |
| 5,745,754 A | | 4/1998 | Lagarde et al. |
| 5,761,280 A | | 6/1998 | Noonen et al. |
| 5,799,278 A | * | 8/1998 | Cobbett et al. ............. 704/232 |
| 5,802,526 A | | 9/1998 | Fawcett et al. |
| 5,806,030 A | | 9/1998 | Junqua |
| 5,806,033 A | | 9/1998 | Lyberg |
| 5,809,462 A | | 9/1998 | Nussbaum |
| 5,867,816 A | * | 2/1999 | Nussbaum ................... 704/232 |
| 5,884,262 A | * | 3/1999 | Wise et al. ............... 704/270.1 |
| 5,913,196 A | * | 6/1999 | Talmor et al. .............. 704/270 |
| 5,915,001 A | * | 6/1999 | Uppaluru ................. 379/88.22 |
| 5,953,392 A | * | 9/1999 | Rhie et al. ................ 379/88.13 |
| 5,991,712 A | * | 11/1999 | Martin ......................... 704/10 |
| 6,101,473 A | * | 8/2000 | Scott et al. .................. 704/275 |
| 6,134,235 A | * | 10/2000 | Goldman et al. ........... 370/352 |
| 6,167,376 A | * | 12/2000 | Ditzik ......................... 704/231 |
| 6,240,448 B1 | * | 5/2001 | Imielinski et al. ........ 379/90.01 |
| 6,269,336 B1 | * | 7/2001 | Ladd et al. .................. 704/270 |
| 6,335,928 B1 | * | 1/2002 | Herrmann et al. .......... 370/352 |
| 2001/0033564 A1 | * | 10/2001 | Hickman ..................... 370/352 |

FOREIGN PATENT DOCUMENTS

GB    2317070 A  *  3/1998    ........... H04M 3/50

OTHER PUBLICATIONS (viii) Cover, Robin, "The XML Cover Pages", Jan. 4, 2001, extracted from Google on Internet on 01/19/20Press Releases, Oct. 6, 1998, The Web Finds Its Voice. VoxML, an upcoming Web Standard, will let you talk to your favorite Web site over t.*

(Continued)

Primary Examiner—Yogesh C. Garg
(74) Attorney, Agent, or Firm—Roylance, Abrams, Berdo & Goodman, L.L.P.

(57) ABSTRACT

A voice-enabled system for online shopping provides a voice and telephony interface, as well a text and graphic interface, for shopping over the Internet using a browser or a telephone. The system allows customers to access an online shop, search for desired database items, select items, and finally pay for selected items using a credit card, over a phone line or the Internet. A telephony-Internet interface converts spoken queries into electronic commands for transmission to an online shop or database. Markup language-type pages transmitted to callers from the online-shop or database are parsed to extract selected information. The selected information is then reported to the callers via audio messaging.

14 Claims, 8 Drawing Sheets

OTHER PUBLICATIONS

Press release, "Programmers Learn to Talk Again with ® Motorola'sVOXML Language", Voice Technology & Services News; Potomac; Oct. 13, 1998. 3 pages extracted from Proquest database http://proquest.umi.com on Internet on Oct. 17, 2002.*

Business/Editors/High Tech Wroters, "®Motorola Introduces Voice Browser Technology for Accessing Web Content from telephones", Business Wire; New York; Sep. 30, 1998, 2 pages extracted from Proquest database http://proquest.umi.com on Internet on 10/17/20.*

Book, Furui, Sadoki; "Digital Speech Processing, Synthesis, and Recognition"; Tokyo: Tokai University Press, 1985; chapter 8, "speech recognition", pp. 225-289.*

* cited by examiner

TELEPHONY-DATA APPLICATION INTERFACE APPARATUS AND METHOD FOR MULTI-MODAL ACCESS TO DATA APPLICATIONS

CROSS-REFERENCE TO RELATED PATENT APPLICATION

Related subject matter is disclosed and claimed in co-pending U.S. patent application Ser. No. 09/167,486, filed Oct. 7, 1998.

FIELD OF THE INVENTION

The invention relates to a telephony-Internet interface and a voice-enabled electronic shopping cart for allowing customer access to online shops via conventional browser technology or spoken queries.

BACKGROUND OF THE INVENTION

Existing electronic shopping cart technology is limited to serving customers who access online shopping sites using HyperText Markup Language (HTML) or other markup language browsers. Currently, no audio-capable electronic shopping cart exists for use with any kind of audio interface such as a telephone, or a computer with a microphone and voice output capability (e.g., voice over the Internet). Furthermore, no telephony interface exists which allows telephone customers to purchase goods offered via online shops.

To illustrate the above-described limitations, a conventional system 10 is depicted in FIG. 1 for shopping via the Internet 18. A user computer 12 (e.g., a personal computer or PC) having browser software 14 can connect via the public switched telephone network (PSTN) or other network 16 to an online shop 20 using different methods such as typing the Uniform Resource Locator (URL) of the online shop, if known, or selecting an online shop or the type of item desired from a home page generated at the PC. While browsing the online shop 20, the user PC 12 receives a number of HTML or Web-type pages for guiding the user when searching for one or more items to purchase and for completing the transaction by a payment method such as a credit card transaction. The transaction can be monitored using a shopping cart 22. An exemplary Web page 24 for allowing a user to conduct a search of items available via an online shop is depicted in FIG. 2. The description of the existing electronic shopping system 10 in FIG. 1 and of the illustrated embodiments of the present invention provided herein will be with reference to an online shop for purchasing books. It is to be understood that various aspects of the present invention can be used with any online shop or catalogue, as well as with any database for applications other than online shopping.

FIG. 3 depicts a conventional database 30 which comprises a number of records 32 such as a record 34 for each book in an online bookshop catalogue. Each record 34 has a number of fields 36, 38, 40, 42 and 44 for entering such information as the book title, author, subject matter, price, ISBN, respectively, among other information. As indicated by the onscreen buttons 40, 48, 50 and 52 in FIG. 2, the Web page 24 provides a user with the option of searching for a book on the basis of book title, author or subject, as well as searching the entire record for each book. The online shop can provide the online user with more specific search pages when one of the three buttons is selected. A processor 31 at the online shop generally searches one or more database fields using the text of the electronic query (e.g., "Gone With the Wind") 54 entered by a user via a Web page. The results of the search following the electronic query are then presented to the user PC via another Web page. If the search results locate an item desired by the user, the user can select that item for placement in an electronic shopping cart. Conventional electronic shopping carts 22 maintain a record of items selected by a user during a browsing session and can assist the user in completing a payment transaction to purchase some or all of the items in the electronic shopping cart during the browsing section or at the conclusion of the browsing session.

Since the online shop 20 receives text queries and reports search results via HTML pages, a user must have a computing device with a browser in order to search for an item available via the online shop, as well as to complete an electronic payment transaction as is the case with many online services. In addition, conventional electronic shopping carts are characterized by a number of drawbacks. Many existing electronic shopping carts maintain user identification and selection data for only a predetermined period. The shopping cart information for a user is generally removed from the server of the online shop shortly after a transaction is completed. The shopping cart information for a browsing session can also be removed during a browsing session after a prolonged period of inactivity. Thus, a user may have to repeat the browsing and shopping cart functions if the transaction data is removed from the server prior to the user making a final selection and purchase of database items.

Also, no database access system exists which allows data input based on spoken words, or has built-in search mechanisms for spoken queries. A built-in mechanism for spoken queries is different from providing a speech recognition system as an input mechanism to a database. In such a system, the speech recognition system receives audio samples, and converts the audio samples to text as though they were typed (e.g., entered in an onscreen query window such as in FIG. 2). The speech recognition system then sends the text output to the database for searching record field(s) based on text. The database has no means of searching based on an audio sample itself. Thus, a voice-optimized database is needed which permits an intelligent search of database records in response to spoken words.

SUMMARY OF THE INVENTION

The present invention overcomes the deficiencies of existing electronic online shopping systems and realizes a number of advantages over these systems by allowing spoken queries.

In accordance with one aspect of the present invention, a telephony-Internet interface allows telephone callers to access online databases and electronic shopping carts. The telephony-Internet interface converts spoken queries into text for electronic commands transmitted to online shops or shopping carts, and converts requested information from markup language pages to audio messages for callers.

In accordance with another aspect of the present invention, the telephony-Internet interface uses scripts to translate user input signals (e.g., DTMF tones or speech) into HTTP requests or site-specific requests for transmission to an online database or shopping cart. Hidden tags are provided in the markup language-type pages returned by the online shop or shopping cart to facilitate parsing of pages for information to be reported to the caller via audio messaging.

Alternatively, the telephony-Internet interface uses scripts to extract selected information from a markup language-type page for audio messaging.

In accordance with still another aspect of the present invention, the telephony-Internet interface is configured as a telephony server for accessing a number of selected online catalogues or databases. Markup-language pages from the online catalogues or databases are parsed for reporting information to callers.

In accordance with another aspect of the present invention, the telephony-Internet interface is connected to a voice-enabled electronic shopping cart. The voice-enabled electronic shopping cart is configured to provide hidden tags in markup-language pages from the online catalogues or databases to facilitate parsing by the telephony-Internet interface.

In accordance with yet another aspect of the present invention, the telephony-Internet interface is provided at a voice-enabled shopping cart.

In accordance with another aspect of the present invention, the telephony-Internet interface provides a caller with a menu for selecting an Internet site or item-type for browsing. The user selects a menu option using DTMF tones or speech. An HTTP request is then generated to access the selected online site through the desired item-type is available.

In accordance with another aspect of the present invention, data extracted from a markup language-type page via parsing is used to generate an audio message using text-to-speech conversion and pre-recorded messages.

In accordance with another aspect of the present invention, shopping cart contents of different users are provided to or accessed by merchants for fulfillment.

BRIEF DESCRIPTION OF DRAWINGS

The various aspects, advantages and novel features of the present invention will be more readily comprehended from the following detailed description when read in conjunction with the appended drawings, in which.

Throughout the drawing figures, like reference numerals will be understood to refer to like parts and components.

DETAILED DESCRIPTION OF THE PREFERRED EMBODIMENTS

Figure 4:
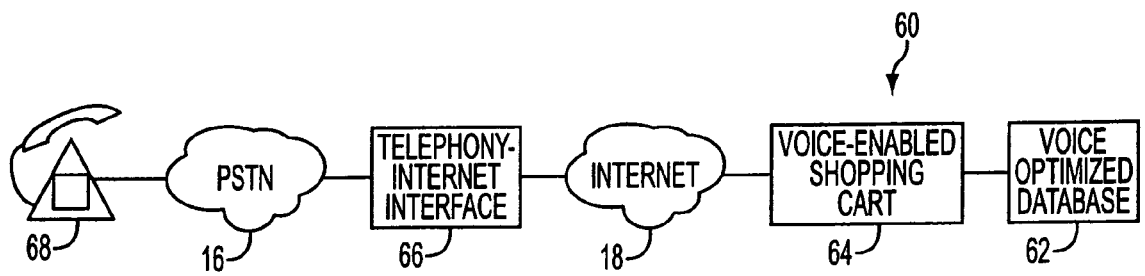
FIG. 4 is a diagrammatic illustration of a voice-enabled online shopping system constructed in accordance with an embodiment of the present invention.

With reference to FIG. 4, a voice-enabled system 60 for online shopping is provided in accordance with the present invention to allow customers to access an online shop, among other databases. The voice-enabled system 60 comprises three main subsystems, that is, a voice-optimized database or catalogue 62, a voice-enabled shopping cart 64 capable of generating output for both online shoppers using a browser and telephony users connecting through a telephony interface, and a telephony-Internet interface (TII) 66 which connects a user via a telephone 68 or other telecommunications device to an electronic shopping cart for online shopping. It is to be understood that the telephone 68 or other telecommunications device can connect to the TII 66 via wireline and wireless modes of communication.

Figure 5:
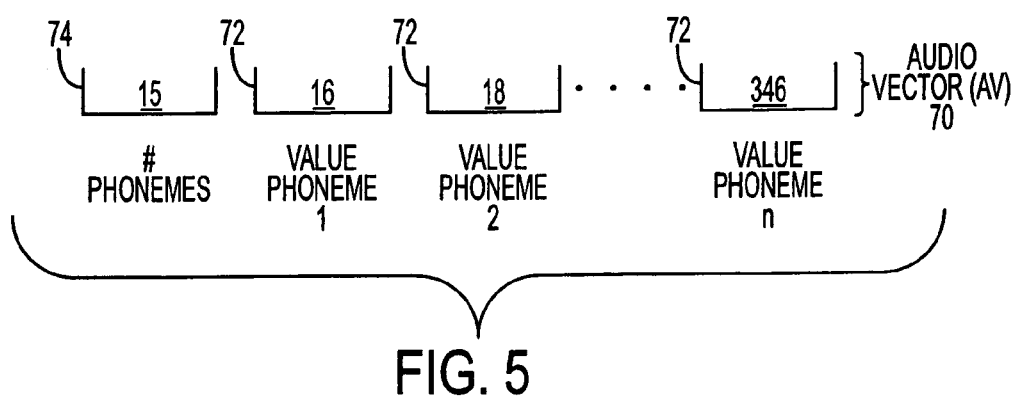
FIG. 5 illustrates an audio vector in accordance with an embodiment of the present invention.

The voice-optimized database is a database 62 of items which can be searched either using electronic queries (i.e., queries of the type normally available on Internet search engines), or spoken words over the telephone 68 or other audio mediums such as voice over the Internet. An important aspect of the voice-optimized database 62 of the present invention is that each searchable item stored therein is assigned an Audio Vector (AV) 70 which characterizes the item in terms of how the item sounds when spoken. For example, an AV 70 can comprise a string of values (e.g., 15, 16, 18 . . . 346), each of which corresponds to a vector component 72, as shown in FIG. 5. In accordance with an embodiment of the present invention, the values of vector components 72 are determined by the phonemes in the searchable item's name or phrase, that is, each vector component 72 can correspond to a numerical value assigned to a phoneme. Assignment of values to phonemes is based on how closely two phonemes sound. For example, the two allophones [p] and [$p^h$] in "spit" and "pit", respectively, are preferably assigned very close values such as values that are numerically close in a range of values. An AV 70 can also comprise a vector component 74 indicating the number of phonemes which constitute the spoken phrase or the item name or phrase stored in a database to which the AV corresponds.

Figure 6:
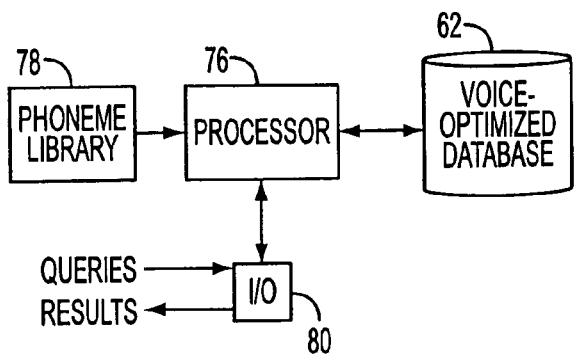
FIG. 6 is a block diagram of a voice-optimized database constructed in accordance with an embodiment of the present invention.

When a spoken query is received for the voice-optimized database 62, a processor 76 operating in conjunction with the database 62, as depicted in FIG. 6, is programmed to parse the query based on the phonemes therein, and to assign an AV 70 value to the query. Values for respective phonemes in the query can be obtained from a library 78, for example. A library 78 for a given language or dialect can store records of each phoneme used in that language and dialect. Each library record stores a predetermined value for that phoneme. Phoneme values can be individual numbers, or vectors if minute degrees of distinction are desired between similar-sounding phonemes. The voice-optimized database 62 is then searched for all searchable items having AV values close to the AV value of the spoken query. The processor 76 then reports the matching results via an input/output (I/O) module 80. Searching will be described with reference to FIG. 7. Reporting search results will then be described with reference to FIG. 8.

Figure 7:
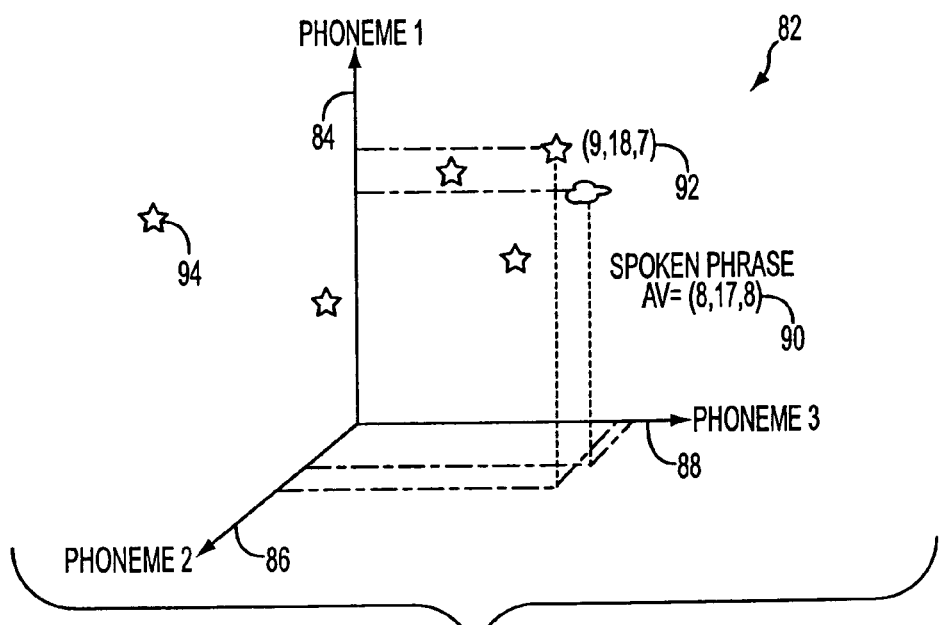
FIG. 7 illustrates audio vectors in a phoneme space in accordance with an embodiment of the present invention.

For illustrative purposes, FIG. 7 provides a simplified view of the phoneme space 82 associated with utterances having only three phonemes. As stated previously, an AV 70 is made of a number of vector components (e.g., components 72). Each vector component 72 represents a phoneme in a spoken phrase. Thus, a matrix having three axes 84, 86 and 88 (i.e., an x-axis, a y-axis and a z-axis) is used to represent the simplified phoneme space. The AV 90 for a spoken phrase is determined to be (8, 17, 8), while the AV 92 of a database item having similar pronunciation is (9, 18, 7). The AV 94 for a database item having a distinct pronunciation is (7, 30, −1).

By way of another example, the voice-optimized database processor 76 assigns a spoken phrase a Spoken Phrase Audio Vector AV1=$(x_0, y_0, z_0, k_0, l_0)$. As described in further detail below, AVs can be assigned to different pronunciations of each database item. The AVs assigned to each searchable database item is then used to determine if the same or similar phrase is in the database. A Database Item Audio Vector AV2 can be $(x_1, y_1, z_1, k_1, l_1)$, for example. A method of comparing the distance between the AV of a spoken phrase with the AVs of a database item having different lengths is described below. To search a database for a phrase using Audio Vectors, the following vector distance formula is used:

Distance=Second Root of $[(x_0-x_1)^2+$ $(y_0-y_1)^2+(z_0-z_1)^2$ $+(k_0-k_1)^2+(l_0-l_1)^2]$ The closest points are reported as matches to the user. A no-space distance calculation formula is preferably used. In accordance with the present invention, the vector distance formula is adapted to the situation wherein the number of detected phonemes is not equal to the number of phonemes in a given database item keyword or phrase. In such cases, the following algorithm is used:

For all keywords in a given field in the database (e.g., author name):

If number of components of the spoken query equals the number of components in the keyword, then calculate distance according to the above vector distance formula;

Otherwise, if the number of components of the spoken query is more than the number of components in the keyword by n% (e.g., n=5–20%), then:

(1) Remove the most distant, excess components from the spoken query AV, and (2) calculate distance according to the above vector distance formula;

Otherwise, if the number of components of the spoken query is less than the number of components in the keyword by n%, then:

(1) Remove the most distant, excess components from the keyword AV, and (2) calculate distance according to the above vector distance formula;

Otherwise, ignore this keyword and continue to process the next keyword.

Exact matches between the audio vectors of a spoken query and database items are not required, allowing users to be less precise when stating a query. A voice-enabled database 62 stores a plurality of AVs for each searchable item in a database. AVs corresponding to different pronunciations of each searchable item are stored in the voice-enabled database. Different pronunciations can include anticipated differences is callers' speech patterns (e.g., "I bet you" and "I be chu"), as well as different expressions for the same item (e.g., different expressions for numbers). For example, a user can speak the ISBN number of a desired book that the user wishes to order from an online book shop. Audio vectors are provided for spoken words such as "one, three, two, zero, "one, three, two, '0'", and "one thousand, three hundred and twenty". The database stores several of these AVs for the searchable item "1320". The above-referenced formula is used to relate audio vectors for these different spoken queries to one of the stored AVs during a search. In addition to taking into account different data formats or types (e.g., numeric, decimal, alphanumeric, binary, hexadecimal), the processor 76 can take into account different conjunctions of phonemes. In accordance with the present invention, the processor 76 can compare AVs for spoken words such as "I bet you" and "I be chu" to different AVs stored for "I bet you" as a searchable item in the database. As will be described below, the AVV method can be provided as an AVV module to a system which does not have a voice-enabled shopping cart 64 or a voice-optimized database 62. Accordingly, AVV can be performed by processors other than the processor 76.

In accordance with the present invention, Audio Vector Valuation (AVV) is used to provide an audio interface to other electronic systems wherein knowledge of potential requests (i.e., knowledge of the context in which requests will be made) can facilitate the identification of a user's spoken words. For example, when a caller is giving an online shop his or her address via a telephone, the voice-enabled system 60 of the present invention can instruct the user to first provide a zip code. The user can enter the zip code by dialing the corresponding digits on the telephone keypad to generate appropriate dual-tone multi-frequency signals which can be translated to the zip code by the TII 66, for example. The voice-enabled shopping cart 64 can then instruct the user to say his or her street name. When the street name is spoken, the voice-optimized database 62 matches the audio pattern to the closest match in a database of street names within the given zip code, thereby alleviating the need for spelling of the name via the telephone keypad. As the above example demonstrates, Audio Vector Valuation can be used in many different applications, to match a spoken pattern with the knowledge of the context in which it is said.

Throughout the description of the present invention, an HTML-type page is understood to mean any type of hypertext or mark-up language (e.g., HTML, DHTML and XML) or language using hidden tags in text for creating, for example, Web-type pages for browsing content. As stated previously, telephone users do not have a computer with which to receive HTML-type pages to query and view search results from an online database. The TII 66 described below provides a mechanism to facilitate audio messaging to report search results, among other events and information, to a telephony customer. In accordance with an aspect of the present invention, the voice-enabled shopping cart 64 is operable to generate hidden tags to convert search results and other information provided by the online shop 20, which can be in a text or HTML format, for example, to an audio message that can be provided to a telephony customer.

Figure 8:
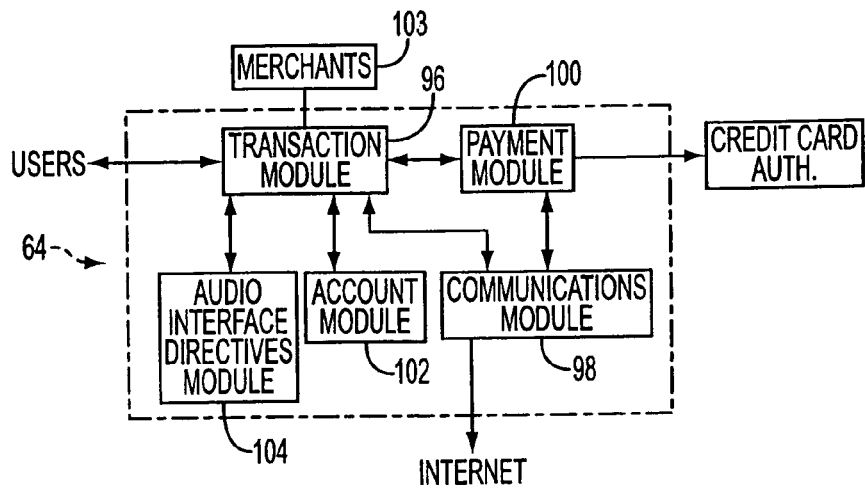
FIG. 8 is a block diagram of a voice-enabled shopping cart constructed embodiment of the present invention.

The voice-enabled shopping cart 64 of the present invention is a software module to provide a layer of control above the voice-optimized database 62 of the present invention or an existing database (e.g., database 30) to facilitate online shopping. As shown in FIG. 8, the voice-enabled shopping cart 64 comprises transaction module 96 for communicating with a user computer or the TII 66, for example, a communications module 98 for communicating with an online shop or other database, a payment module 100 for completing electronic credit card transactions, and an account module 102 for monitoring each user transaction and the user's selections during a browsing session and, optionally, account information for users who are account holders. Thus, an account holder can browse an online shop, select items for the voice-enabled shopping cart, hang-up before purchasing the items, and then call the online shops at a later time to complete the transaction. The account module 102 is useful for maintaining company accounts. Employees can browse company-approved suppliers online to make selections and log-off prior to purchasing their selections. A company purchasing manager can then access the shopping carts created using a company account at the end of a business day, for example, and approve or disapprove of selections in each cart and complete a purchase transaction for approved items. The account module 102 can provide different levels of access. For example, one level of access can be restricted to cart selections only with no purchase capability. Another access level can permit order approvals and purchasing. The shopping cart 64 is configured to provide a merchant 103 with shopping cart contents or lists for fulfillment. Merchants can obtain lists via facsimile, e-mail or other communications means. Merchants can also access the shopping cart to download lists which have been approved for ordering.

In accordance with the present invention, the voice-enabled shopping cart also comprises an audio interface directives module 104 for providing hidden tags in the HTML-type pages provided by the online shop during a browsing session. The hidden tags are used by the TII 66 and other audio interfaces (e.g., Netscape browser with audio plug-in) to locate relevant information in an HTML-type page (e.g., a search result page indicating that the online shop has two book titles relating to a particular subject specified in a spoken query). For example, the hidden tags indicate where the book title information, price information or out-of-stock message is located in a search results HTML page returned by an online bookstore in response to a spoken query. The TII 66 can then generate an appropriate audio message to provide the search result data to the user. Since the search result pages for different online shops comprise different information in different locations within an HTML page, the voice-enabled shopping cart 64 can be provided to different online shops with scripts to assist online shop providers in modifying their respective search results pages and any other pages to include hidden tags or other data in the HTML-type page(s) as necessary to communicate with the TII 66.

Figure 9:
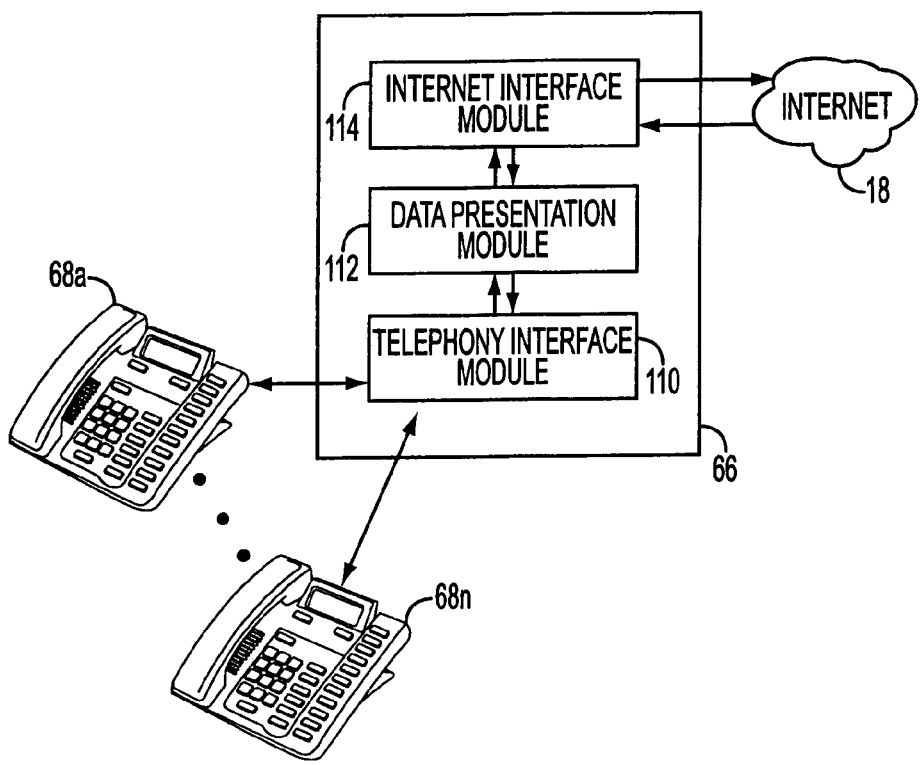
FIG. 9 is a block diagram of a telephone-internet interface for online shopping constructed in accordance with an embodiment of the present invention.
Figure 10:
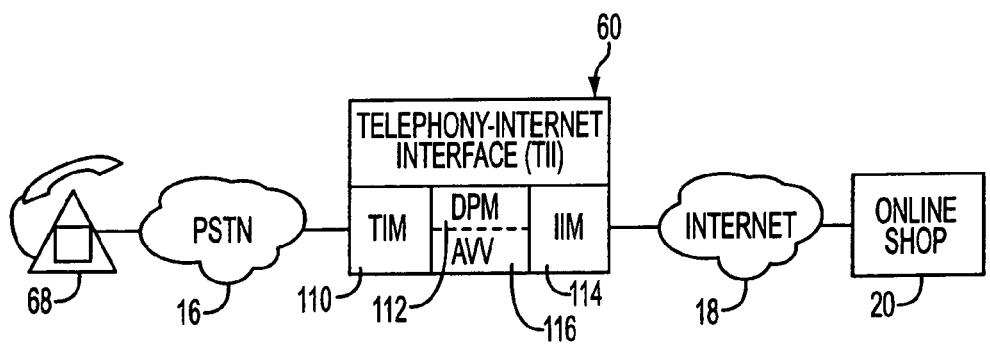
FIGS. 10, 11, 12, 13 and 14 are block diagrams of different configurations of a voice-enabled online shopping system constructed in accordance with an embodiment of the present invention.

The TII 66 allows customers to access an Internet or online shop using plain old telephone service (POTS) telephones, computers or other telecommunications devices. The TII 66 comprises hardware and software components to connect to the Public Switching Telephone Network (PSTN), as well as the Internet. The subsections of the TII 66 are shown in FIG. 9.

A Telephone Interface Module (TIM) 110 is provided which has hardware and software components for handling incoming calls from the PSTN, and provide audio communications to customers. For example, the TII 66 can instruct a telephone user to select one of a preselected number of Internet sites to which access is desired by selecting from pre-recorded menu options. The user responds by stating or dialing a digit corresponding to the selected menu option. TIM 110 also performs speech recognition, speech-to-text and text-to-speech conversion operations, if necessary. The text/speech conversion can be implemented via commercially available software. TIM can handle multiple connections at any given time.

A Data Presentations Module (DPM) 112 converts commands received from the TIM 110 into electronic commands such as HTTP requests (e.g. HTTP get and HTTP post) and other electronic communication protocols, and changes replies received from an Internet Interface Module (IIM) 114 to information that can be presented to a customer in an audio format by the TIM. To communicate with the above-mentioned pre-selected sites, the DPM 112 uses scripts to translate user inputs (e.g., DTMF tones or speech that has been converted to text by the TIM 110) into input information (e.g., electronic commands such as HTTP requests and site-specific queries) for these sites. The DPM 112 parses the HTML-type information returned by a site (e.g., an online shop or database) via the IIM and posts queries to the site query pages provided to the IIM 114. By parsing the information in the HTTP replies, important data items are extracted and can be reported to the customers. If the electronic shopping cart used is a voice-enabled shopping cart 64 (FIG. 8), the DPM looks for hidden tags generated by the voice-enabled shopping cart to identify the important data items. To parse the output of other shopping carts, DPM uses site specific scripts which help to identify what each site's output means, and where important data elements reside. For example, when looking at an online bookstore's search output, the DPM preferably extracts only names of any books found to match or are similar to a user's query. The DPM can handle multiple customers at any given time.

The Internet Interface Module (IIM) 114 consists of the hardware and software for connecting to the Internet. The IIM handles multiple connections to different sites (e.g., online shops). IIM 114 receives connection commands and addresses from the DPM 112, and returns results in form of HTML-type pages or pages created using other mark-up languages.

The voice-enabled system of the present invention can be implemented in a number of different ways. The voice-enabled system can provide a fully integrated solution for online shopping, as well as telephone shopping, or only a portion of the solution. The voice-enabled system of the present invention can be integrated into an existing shopping cart, an existing database, or an existing telephone shopping system which currently has no online capability (e.g., a catalog order system using telephone operators to process transactions). A few of these different configurations, in which one or more elements of the voice-enabled system 60 are used, are described below in connection with FIGS. 10–13 for illustrative purposes. It is to be understood that other configurations are possible.

In a full implementation of the voice-enabled system, the components described above in connection with FIG. 4 are used to provide Internet catalogue and database capabilities, a voice-enabled electronic shopping cart and telephone-Internet interface capabilities for users. In the configuration depicted in FIG. 10, only the TII 66 is used to provide connectivity to an existing online shop. Since the database in this configuration does not support Audio Vector Valuation for voice queries, the DPM 112 is enhanced with a Audio Vector Valuation Module 116 to send in multiple queries based on what a given query sounds like. For example, phonemes are determined for "Gone with the Wind", or "Gone wid da Wind", or "Gone vid da Vind", and so on. Linguistic rules are used to select different pronunciations of a requested item. The phonemes are converted to text. Multiple types of related text is therefore determined for the spoken query text. Searches are then performed in the database using the spoken query text and the related text.

Figure 11:
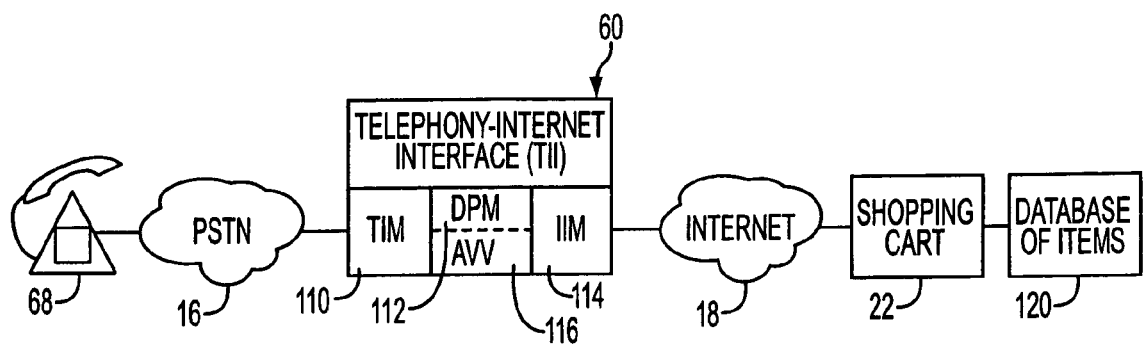

In FIG. 11, a TII 66 and a shopping cart 22 are connected to an existing database 120 of items to provide an online shop that is also accessible by telephone. As in FIG. 10, the TII 66 can be enhanced by an Audio Vector Valuation module 116 to compensate for lack of such functionality in the database 120. As stated previously, a voice-enabled database is configured to store AVs for multiple pronunciations of searchable items in the database. In a non-voice-enabled database, several samples of a spoken query are generated to conduct multiple searches of the data in the database. The phoneme string of the spoken query sample is selectively divided and regrouped to create, for example, five or six variations of the phoneme string. In accordance with the present invention, individual phonemes in the string are analyzed, as well as combinations of phonemes and individual phonemes which have been divided. These components of the string are analyzed in phonemic space to compare respective vector distances, for example. Phonemes and corresponding string components which are relatively close in value indicate possible desirability of these string components in alternate samples. The spoken query samples and the alternate samples are then converted to text for searching the database for corresponding items.

In accordance with the present invention, a voice-enabled database and a non-voice-enabled database are searched with regard to plural possibilities for a spoken query. In the voice-enabled database, AVs are stored for plural anticipated pronunciations of the same database item for comparison to the AV of a spoken query. The phonemic string of a spoken query is used to create plural samples for searching a non-voice-enabled database having no AVs stored therein. In either case, the use of phonemes is used to convert from spoken words to concepts in that plural pronunciations for the same database item are considered for searching database content. The audio processing of the present invention therefore realizes an advantage over existing phoneme recognition systems which merely analyze phonemes for word recognition.

Figure 12:
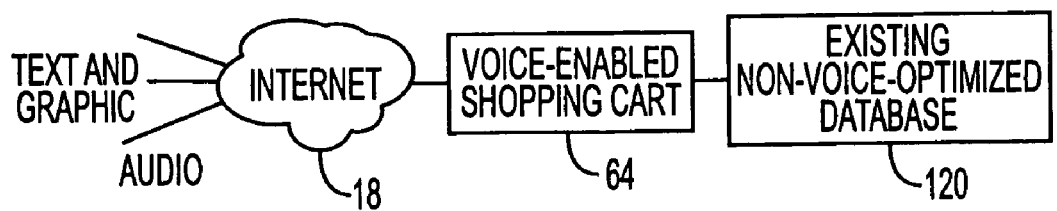
Figure 13:
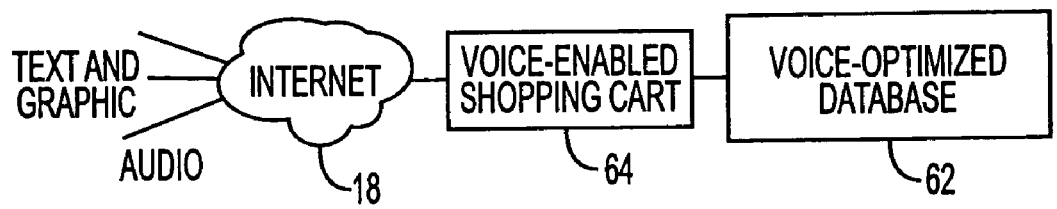
Figure 14:
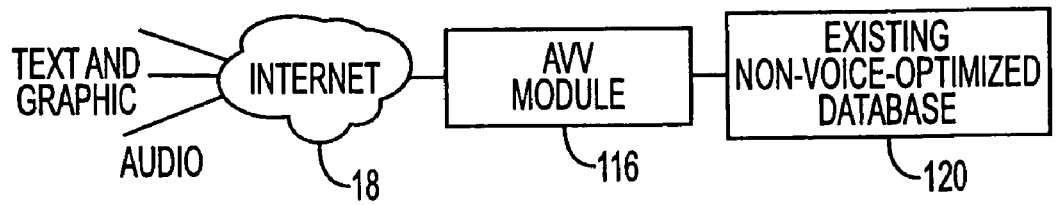

The audio interface can be accomplished using a technology similar to TII 66, or voice over IP, or other means. In FIG. 12, a voice-enabled shopping cart is used to access an existing database of items or catalogue and provide shoppers with a means for electronic shopping. In addition to traditional shopping cart functions (e.g., keeping track of a shopper's purchases, communicating with the catalogue, and sending information to a payment system), the voice-enabled shopping cart provides directives for audio interface systems to allow telephone callers to access the shop. Thus, an online shop is provided to support online customers using text, graphics, and audio interfaces. FIG. 13 is similar to FIG. 12, except a voice-optimized database is used. In FIG. 14, an AVV module 116 is provided to an existing database in lieu of a voice-enabled shopping cart to allow access to the database via spoken queries.

Figure 15A:
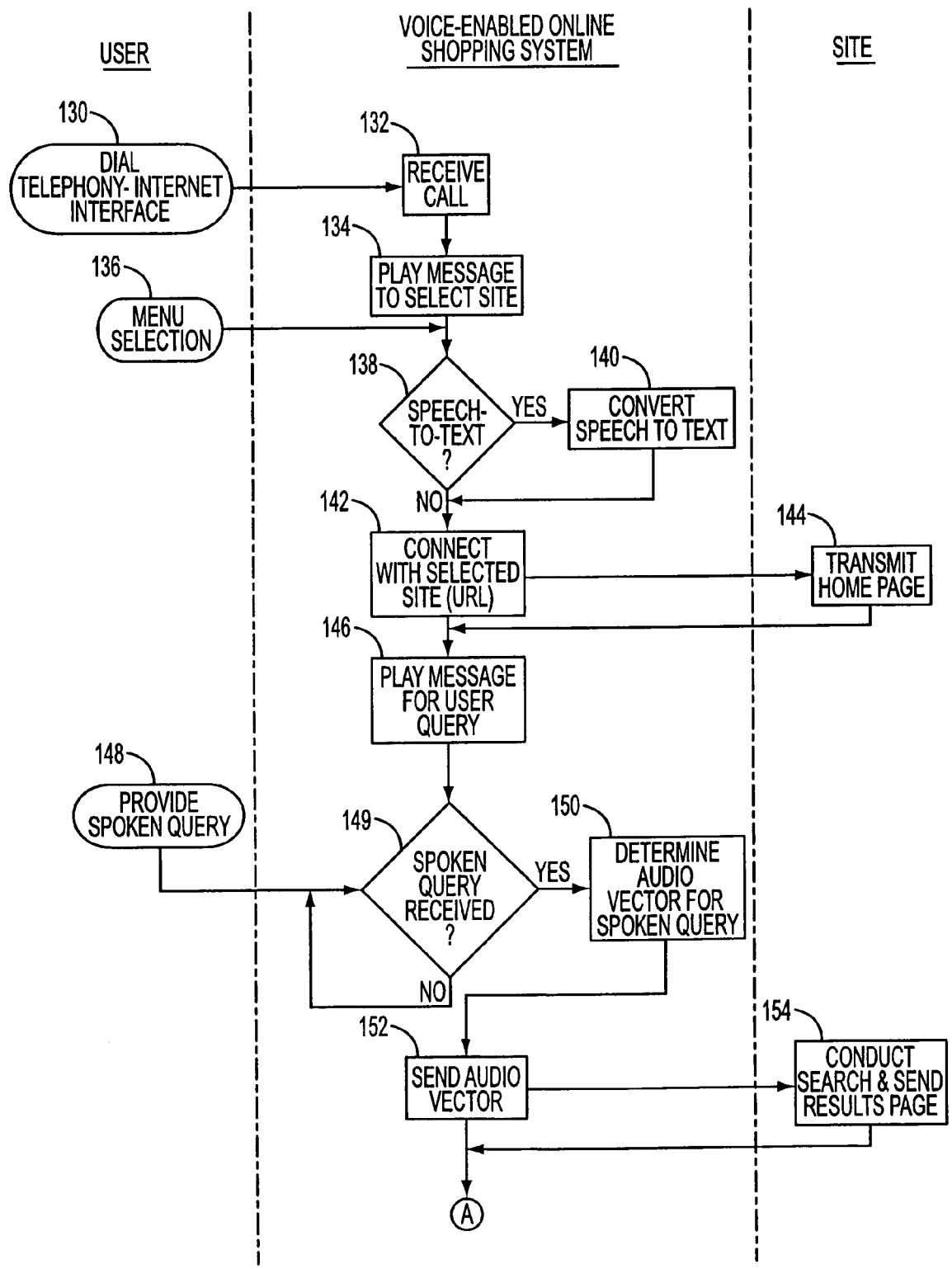
FIGS. 15A and 15B are flow charts depicting a sequence of operations for browsing an online shop using a telephone or other audio interface in accordance with an embodiment of the present invention.
Figure 15B:
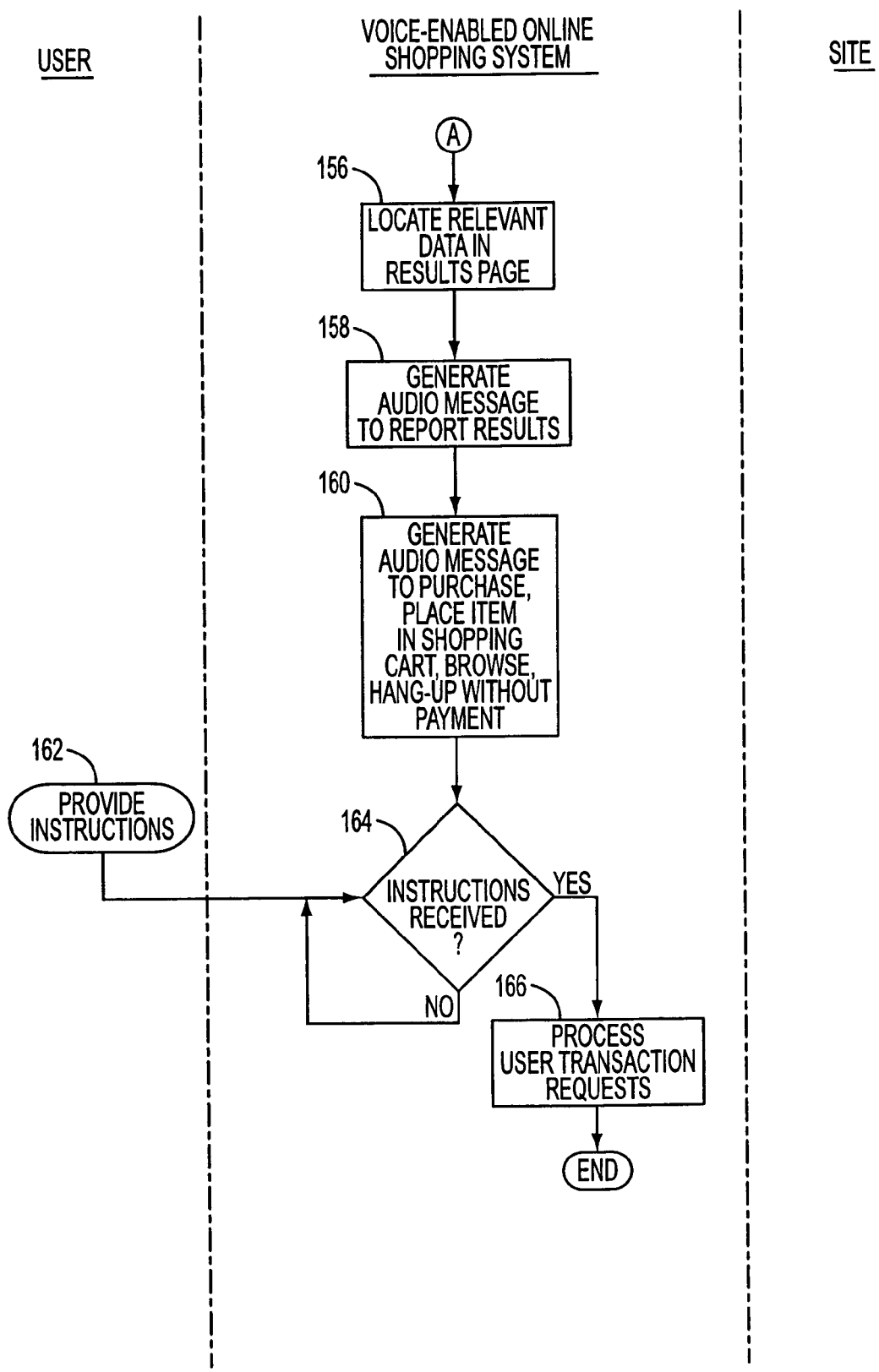

An exemplary voice transaction with an online shop is illustrated in FIGS. 15A and 15B. A user calls a TII 66 using an '800' number, for example (blocks 130 and 132). The TIM 110 plays a pre-recorded message to the user to provide a number of site options (e.g., "If you wish to browse for books, dial or say '1' . . . "If you wish to browse for computer equipment, dial or say '2' . . . "If you wish to browse for airline tickets, dial say '3' . . . "If you wish to repeat this list, press the pound key or say 'repeat'"), as indicated in block 134. In the illustrated example, the caller selects to browse for books. The TIM 110 provides the user selection information to the DPM 112. If the caller stated "1" (block 136), as opposed to dialing the menu selection, the TIM 110 performs speech-to-text conversion (blocks 138 and 140).

Figure 1:
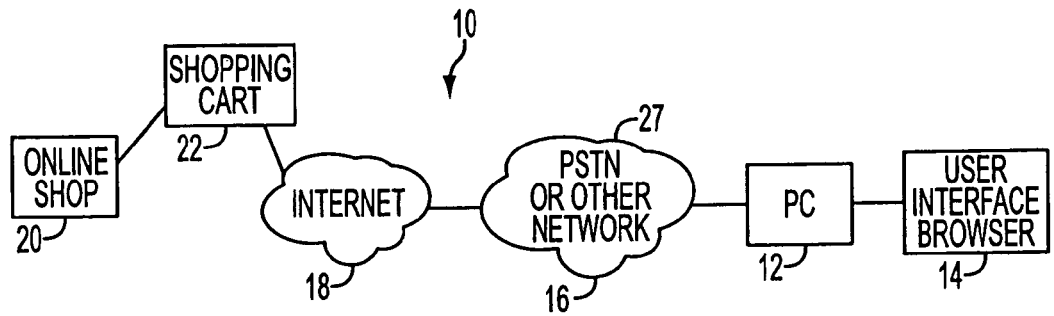
FIG. 1 is a diagrammatic illustration of a conventional electronic online shopping system.
Figure 2:
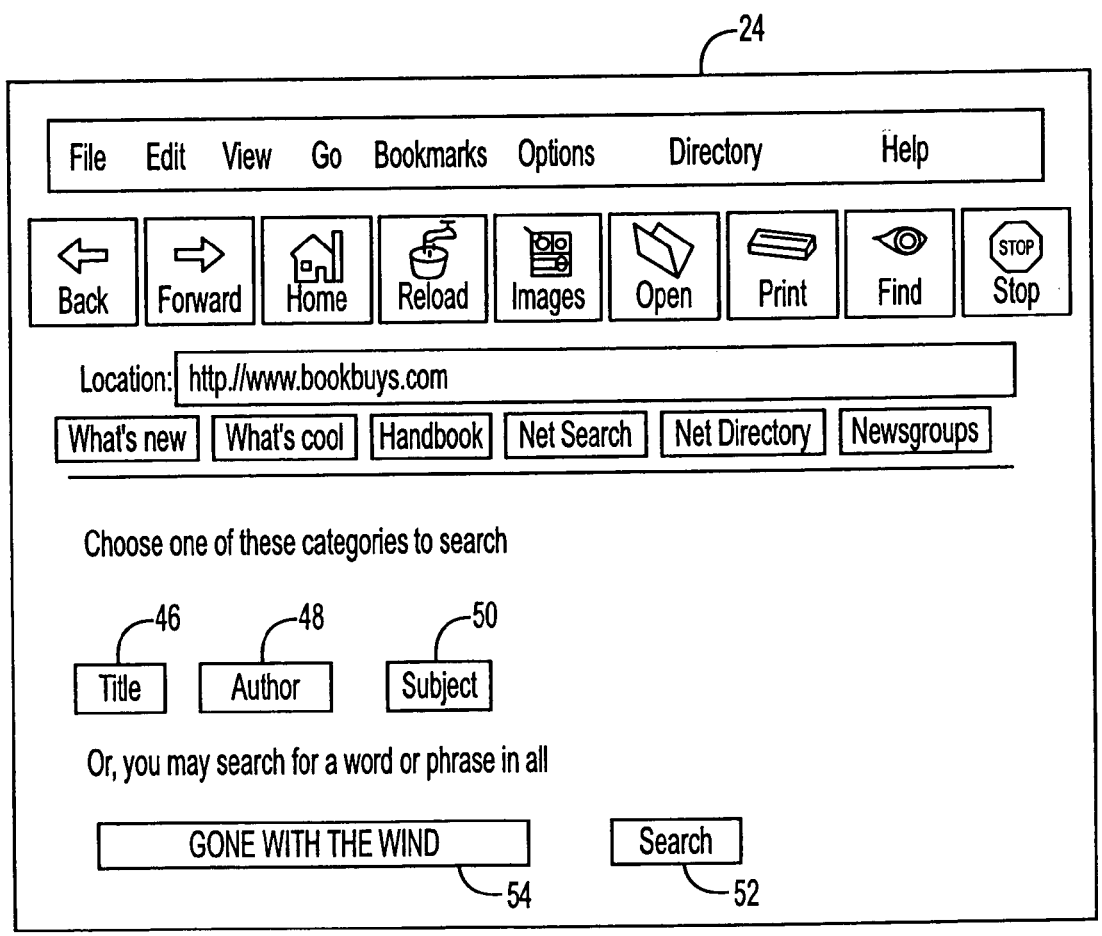
FIG. 2 is a diagrammatic illustration of an exemplary HTML page generated on a customer computer while browsing online.
Figure 3:
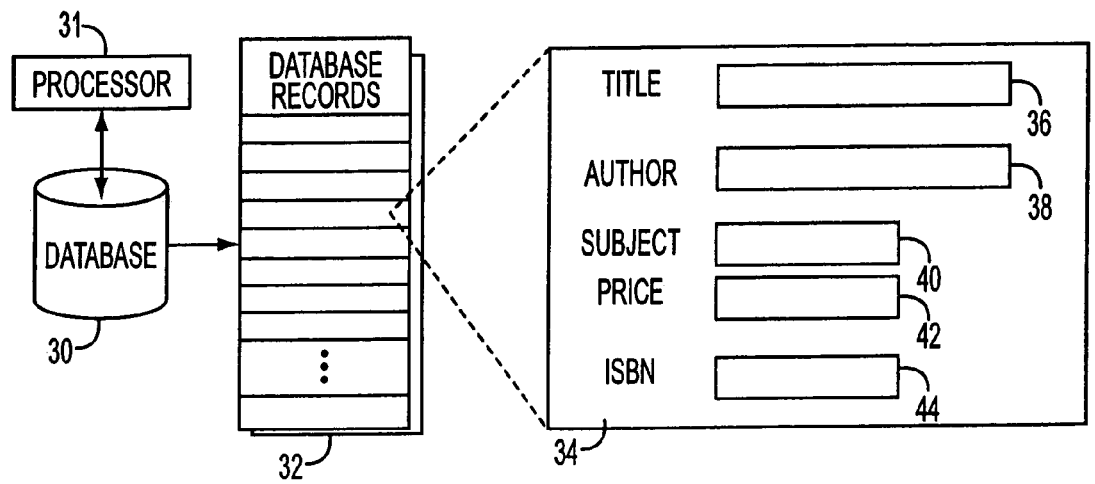
FIG. 3 is a diagrammatic illustration of a conventional database having records with record fields.

The DPM uses an input script to provide the URL for the online bookshop and contacts the online bookshop via the IIM 114 (block 142). As indicated in FIG. 144, the online bookshop returns a Web-style home page which provides browser users with onscreen prompts to enter query information, such as the page 24 in FIG. 2. The DPM 112 provides an audio message to the user via the TIM 110 which instructs the user to state the name or author of a book, for example (block 146). The message can also instruct the user to state a search category (e.g., "subject" or "title" or "author" or "ISBN"). Thus, if the user states "subject", the DPM 112 is programmed via an input script to select the button 50 in the query page 24 (FIG. 2) via an electronic command. The online bookshop can then perform a context-sensitive search of subject matter in its database, as well as search only the subject fields 40 of database records 34 instead of every searchable item in each record.

After the user provides a spoken query such as "civil war" (blocks 148 and 149), the query is processed by a speech recognition module in the TIM 110. An audio vector 70 is determined for the spoken query using, for example, an AVV module 116 at the TII 66 (FIG. 4) or at a shopping cart in front of a non-voice-enabled database (FIG. 12) or at a voice-optimized database 62, for example, depending on the configuration of the voice-enabled shopping system of the present invention (block 150). The online bookshop searches its records for database items that are close to the spoken query and transmits a Web-type results page to the TII 66 (blocks 152 and 154).

The DPM 112 parses the results page to locate hidden tags if a voice-optimized shopping cart 64 is used; otherwise, the DPM 112 uses site-specific scripts to locate relevant information (e.g., titles of books having AVs which are close to the spoken query AV) to report to the caller (block 156). The DPM 112 can play a pre-recorded message to the caller when no books are located which are similar to the spoken query. Text corresponding to the title in the results page can be converted to speech by the TIM 110 to provide at least a few of the book titles listed in the results page to the caller (block 158). Another message can be generated by the DPM 112 to instruct the user to select from a menu of options such as placing selected book titles from the results page in a shopping cart 64 or 22 and commencing a payment transaction (block 160). The DPM 112 has a number of scripts and messages for handling shopping cart and payment transactions, as well as the above-referenced browsing operations (blocks 162, 164 and 166).

Figure 16:
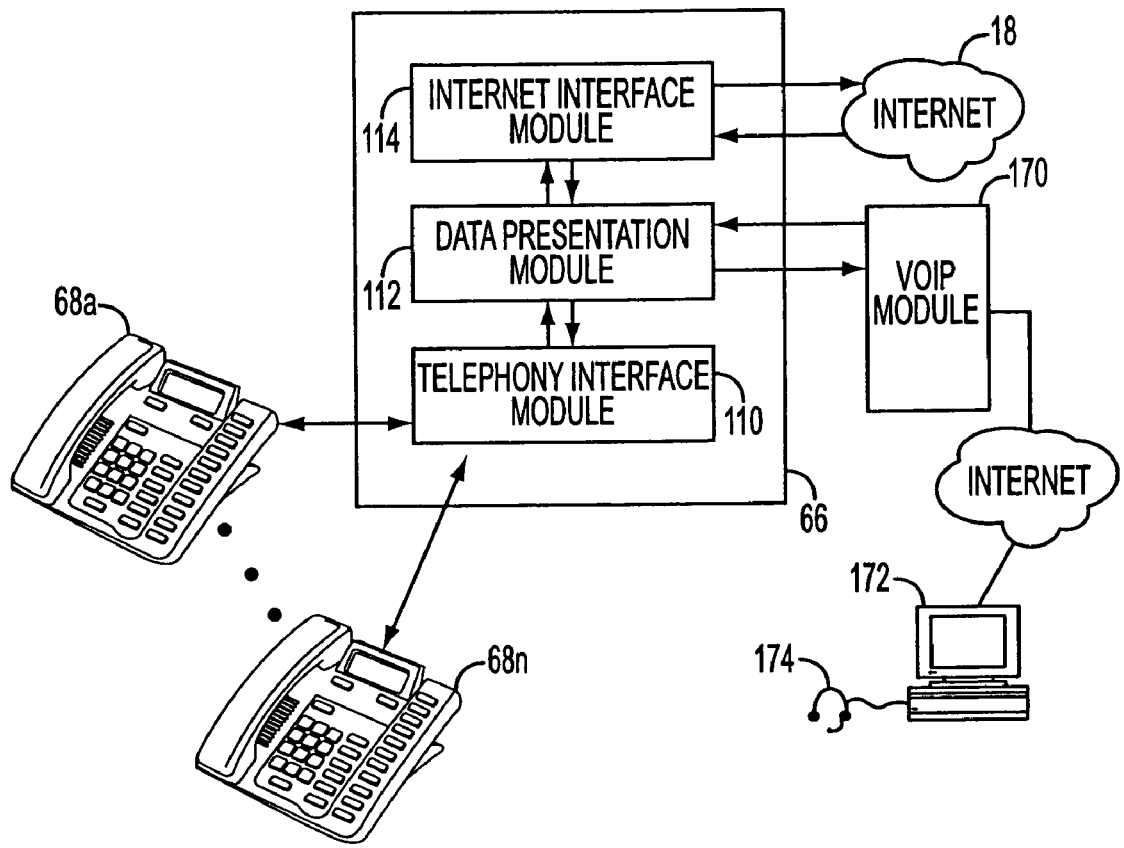
FIGS. 16 and 17 are block diagrams of a voice-enabled Internet interface for online shopping using voice over the Internet in accordance with an embodiment of the present invention.
Figure 17:
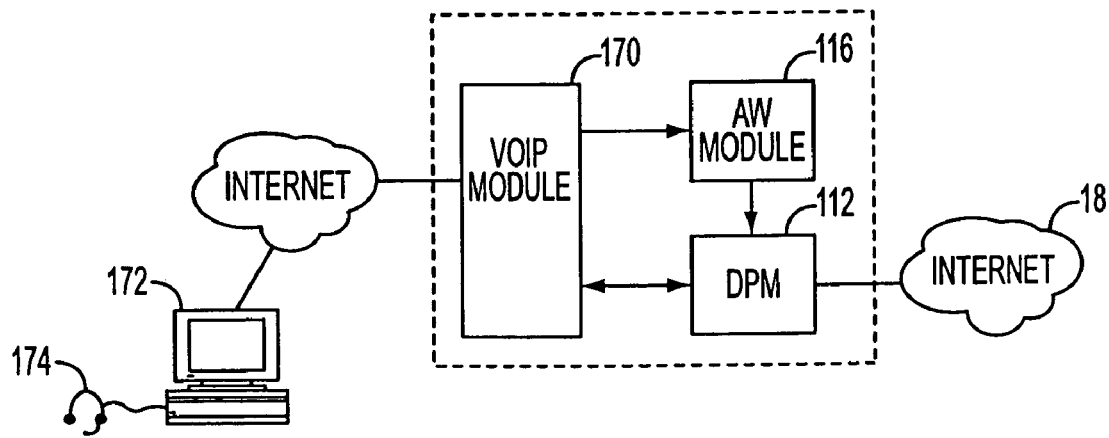

With reference to FIGS. 16 and 17, a voice-enabled Internet interface is provided to access an online catalogue or other database using voice over Internet Protocol (VOIP). As shown in FIG. 16, a VOIP module 170 is connected between a DPM 112 and a computer 172 with a microphone 174. The configuration depicted in FIG. 16 supports online shopping access by telephone 108 and user computers 172 employing VOIP. FIG. 17 depicts a voice-enabled Internet interface for computers 172 and no telephones.

Although the present invention has been described with reference to a preferred embodiment thereof, it will be understood that the invention is not limited to the details thereof. Various modifications and substitutions have been suggested in the foregoing description, and others will occur to those of ordinary skill in the art. All such substitutions are intended to be embraced within the scope of the invention as defined in the appended claims.

What is claimed is:

1. A method of allowing a user to interact with data applications using spoken queries comprising the steps of:
receiving a spoken query from said user;
converting said spoken query to text;
generating an electronic request using at least one electronic command comprising said text;
providing said electronic request to a processing device connected to said at least one of said data applications, said processing device searches a memory device associated with said data application in response to said electronic request to locate selected information available via said data application, said processing device generates search results comprising at least one markup language-type page having information relating to said selected information, said processing device establishing a multi-part session with which to retrieve said selected information and to provide said selected information to said user, said multi-part session allowing a user to return to where a previous session was terminated if the previous session was interrupted;
providing audio tags in combination with non-audio tags in said at least one markup language type page identifying said information;
receiving said search results during all portions of said multi-part session and provides said search results to said user using both said audio tags and said non-audio tags;
parsing said search results and obtains a portion of said information identified by said audio tags in said at least one markup language-type page;
generating at least one audio message to indicate said portion of said information to said user; and
generating said at least one markup language-type page concurrently with said audio message for selective use by said user;
wherein a first portion of said multi part session allows a user to select an item to order from a Web Site via at least one of a computer terminal and a telephone;
a second portion of said multi-part session allows a user to directly access information from the first portion of said multi-part session via at least one of a computer terminal and a telephone; and
the interruption of said multi-part session comprising a complete termination between said data applications and at least one of said telephone and said computer terminal.

2. A method as claimed in claim 1, wherein said receiving step comprises the steps of:
generating a pre-recorded audio message instructing said user to select one of said data applications using one of a dual-tone multiple frequency tone and a voice command; and
generating a hypertext transfer protocol request to access a selected one of said data applications in accordance with said one of a dual-tone multiple frequency tone and a voice command.

3. A method as claimed in claim 1, wherein said generating step for generating search results comprises the steps of:

receiving a home page from said selected data application; and
providing said text to at least one of said home page and another page generated by said selected data application for processing said spoken query.

4. A method as claimed in claim 1, wherein said parsing step comprises the steps of:
extracting said portion of said information using scripts corresponding to respective said data applications to indicate where said portion of said information is located in markup language-type pages with only non-audio tags received therefrom; and
generating an audio interaction.

5. A method as claimed in claim 1, wherein said generating step for generating said at least one audio message comprises the steps of:
converting said portion of said information into speech; and
combining said speech with a pre-recorded audio message.

6. A method as claimed in claim 1, further comprising the steps of:
tracking and storing transaction data relating to the selection of said items in a voice-enabled electronic shopping cart; and
purchasing at least one of said items in said voice-enabled electronic shopping cart.

7. A method as claimed in claim 1, wherein said converting step comprises the step of converting said spoken query to phonemes, and said providing step comprises the step of searching said database using audio vectors based on said phonemes.

8. A method as claimed in claim 1, further comprising the step of receiving an audio command, said audio command being specified by said information identified by said audio tags.

9. A system for allowing users to browse and purchase items available via the Internet comprising:
a telephony-Internet interface device connecting users to the Internet, at least one of said users communicating with said telephony-Internet interface device via a graphical interface device comprising a display and a user input interface, and telephony interface device, respectively, in one of a simultaneous and sequential manner;
a memory device corresponding to at least one online source available to said users via the Internet for storing records for said items;
a processing device connected to said memory device and said telephony Internet interface device and allows said users to request selected said items using at least one of electronic queries and spoken queries generated via said graphical interface device and said telephony interface device, respectively, said telephony-Internet interface device converts said spoken queries to electronic commands for transmission to said processing device, said processing device establishes a multi-part session during which it receives from said memory device markup language-type pages comprising data relating to selected ones of said records in response to at least one of said electronic queries and said electronic commands from a corresponding one of said users who requested it, said markup language-type pages comprising audio tags and non-audio tags, said telephony-Internet interface parses said markup language-type pages to obtain at least a portion of said data therefrom using said audio tags, generating an audio message corresponding to said at least a portion of said data for playback to said corresponding one of said users, and generates said markup language-type pages concurrently with said audio message for selective use by said corresponding one of said users, wherein said multi-part session allows a user to return to where the previous session terminated if the previous session was interrupted, a first portion of said multi-part session allows a user to select an item to order from a Web Site via at least one of a computer terminal and a telephone, a second portion of said multi-part session allows a user to directly access information from the first portion of said multi-part session via at least one of a computer terminal and a telephone, and said interruption of said multi-part session comprises a complete termination between said data applications and at least one of said telephone and said computer terminal.

10. An interface connecting telephony users to access one or more online information sources using speech, text or graphics comprising:

a telephone interface module configured for access by said users via audio interface devices;

a data presentation module connected to said telephone interface module; and an online interface module connected to said data presentation module and configured for access by said users via graphical interface devices comprising display devices and user input interfaces;

wherein said telephone interface module performs speech recognition and conversion operations between speech and text with respect to multiple users generating commands, said data presentation module converts said commands into at least one online communication protocol, and said online interface module connects to said online information sources and retrieves information therefrom in response to at least one of said commands and requests generated via said graphical interface devices, said data presentation module parses markup language-type pages provided by said online information sources to extract selected information, said markup language-type pages comprising audio tags and non-audio tags, said selected information being provided to said users on said audio interface devices via audio messaging using said audio tags and to said users on said graphical interface devices via at least one of text and graphics; and wherein said data presentation module establishes first and second sessions for at least one of said users and communicates with said interface via a computer and a telephone, and said online interface module establishes a multi-part session with which to retrieve said information requested by said user and provides said information to said data presentation module for playback via at least one of said computer and said telephone, said multipart session allows a user to return to where the previous session was terminated if the previous session was interrupted;

wherein a first portion of said multi-part session allows a user to select an item to order from a Web Site via at least one of said computer and said telephone;

a second portion of said multi-part session allows a user to directly access information from the first portion of said multi part session via said telephone; and said interruption of said multi-part session comprises a complete termination between said data applications and at least one of said telephone and said computer terminal.

11. A voice-enabled electronic shopping system allows a user to browse and purchase items available via online shops on the Internet using spoken queries comprising:

a telephony interface module connecting to said online shops via the Internet and to said user via at least one of an analog line, a digital line and a wireless link, said user connecting to said telephony interface module via at least one of a user computer, a user telephone and a telecommunications device connected to said at least one of an analog line, a digital line and a wireless link, said user computer comprising a microphone for inputting said spoken queries, said telephony interface module processes a call from one of said user telephone, said user computer and said telecommunications device, converts said spoken queries to commands and manages multiple connections to different users;

a data presentation module connected to said telephony interface module; and a communication module connected to said data presentation module and connects to the Internet and manages multiple connections to different web sites;

wherein at least one of said online shops comprises at least one memory device for storing records for said items available via said online shop and a processing device, said processing device being connected to said memory device and said voice-enabled electronic shopping system, said data presentation module converts said commands to an HTTP-type electronic command for transmission to said processing device and manages processing of commands from a plurality of users, said processing device retrieves selected ones of said records from said memory device in response to said spoken queries and generates and transmits markup language-type pages to said voice-enabled electronic shopping system comprising data relating to said selected ones of said records, said markup language-type page having audio tags in combination with non audio tags to identify said selected one of said records, said data presentation module parses said markup language-type pages received from said processing device to obtain at least a portion of said data therefrom and generates an audio message corresponding to said at least a portion of said data for playback via said telephony interface module;

said telephony interface module, said data presentation module and said Internet interface module being allows establishment of, respectively, said connections to different users, said spoken queries from a plurality of users, and said connections to different web sites independently of each other, and to relate selected ones of said connections to different users to said connections to different web sites for said processing of spoken queries corresponding to said selected ones of said different users;

wherein said data presentation module establishes first and second sessions for said user and communicates via said user computer and said user telephone, and said Internet interface module establishes a multi-part session with which to retrieve information requested by said user and provides said information to said data presentation module for playback via at least one of said user computer and said user telephone, said multipart session allowing said user to return to where the previous session was terminated if the previous session was interrupted;

wherein a first portion of said multi-part session allows said user to select an item to order from at least one of said online shops via at least one of said user computer and said user telephone;

a second portion of said mufti-part session allows a user to directly access information from the first portion of said multi-part session via at least one of said computer terminal and said user telephone; and said interruption of said multi-part session comprises a complete termination between said online shops and at least one of said user telephone and said user commuter.

12. A method of allowing a user to interact with data applications using spoken queries comprising the steps of:

receiving a spoken query;

generating an electronic request using at least one electronic command in response to said spoken query, said electronic request being provided to a processing device connected to said at least one of said data applications that searches a memory device associated with said data application in response to said electronic requests locates selected information, and generates search results comprising at least one markup language-type page having said selected information and audio tags in combination with non-audio tags to identify said selected information;

establishing a multi-part session with which to retrieve said selected information and to provide said selected information to said user, said multi part session allowing a user to return to where the previous session was terminated if the previous session was interrupted;

receiving said search results during said multi-part session to provide said search results to said user using both said audio tags and said non-audio tags;

parsing said search results to obtain a portion of said information identified by said audio tags in said at least one markup language-type page;

generating at least one audio message to indicate said portion of said information to said user; and generating said at least one markup language-type page concurrently with said audio message for selective use by said user;

wherein a first portion of said multi part session allows a user to select an item to order from a Web Site via at least one of a computer terminal and a telephone;

a second portion of said multi-part session allows a user to directly access information from the first portion of said multi-part session via a computer and said interruption of said multi-part session comprises a complete termination between said data applications and at least one of said telephone and said computer terminal.

13. A telephony-data application interface device allowing a user to interact with data applications using spoken queries comprising.

a telephony_interface module receiving spoken queries from users;

a data presentation module connected to said telephony_interface module generating an electronic request using at least one electronic command in response to said spoken query; and a data application interface module connecting said data presentation module to said data applications, said electronic request being provided to a processing device connected to said at least one of said data applications that searches a memory device associated with said data application in response to said electronic request to locate selected information, and generates search results comprising at least one markup language-type page having said selected information and audio tags in combination with non-audio tags to identify said selected information;

wherein said data presentation module receives said search results, parses said search results to obtain a portion of said information identified by said audio tags in said at least one markup language-type page, and generates at least one audio message to indicate said portion of said information to said user; and wherein said telephony interface-module establishes first and second sessions for at least one of said users to communicate with said interface via a computer and a telephone, and said data application interface module establishes a multi-part session with which to retrieve said information requested by said user and to provide said information to said telephony interface module for playback via at least one of said computer and said telephone, said multi-part session allows a user to return to where the previous session was terminated if the previous session was interrupted;

wherein a first portion of said multi-part session allows a user to select an item to order from a Web Site via at least one of said computer terminal and said telephone; and a second portion of said multi-part session allows a user to directly access information from the first portion of said multi part session via said telephone; and said interruption of said multi-part session comprises a complete termination between said data applications and at least one of said telephone and said computer terminal.

14. A telephone-data application interface device as claimed in claim 13, further comprising an Internet interface module connected to said data presentation module and operable to connect to the Internet and manage multiple connections to different web sites, wherein said telephony interface module is configured to process a call from one of a user telephone and a user computer and being operable to manage multiple connections to different users, said data presentation module is configured to process commands from said telephony interface module corresponding to spoken queries from a plurality of users, and said Internet interface module is operable to manage multiple connections to different data applications, said telephony interface module, said data presentation module and said Internet interface module being configured to allow establishment of, respectively, said connections to different users, said commands from a plurality of users, and said connections to different data applications independently of each other, and to relate selected ones of said connections to different users to said connections to different data applications for processing of said commands corresponding to said selected ones of said different users.

* * * * *